US012368582B2

(12) United States Patent
Jain et al.

(10) Patent No.: US 12,368,582 B2
(45) Date of Patent: Jul. 22, 2025

(54) SYSTEMS AND METHODS FOR GENERATING AND USING BIOMETRIC SECRET KEYS

(71) Applicant: Aetna Inc., Hartford, CT (US)

(72) Inventors: Salil Jain, Hartford, CT (US); Andrew L. Hinton, Hartford, CT (US)

(73) Assignee: Aetna Inc., Hartford, CT (US)

( * ) Notice: Subject to any disclaimer, the term of this patent is extended or adjusted under 35 U.S.C. 154(b) by 267 days.

(21) Appl. No.: 18/200,228

(22) Filed: May 22, 2023

(65) Prior Publication Data
US 2024/0396723 A1 Nov. 28, 2024

(51) Int. Cl.
H04L 9/08 (2006.01)
(52) U.S. Cl.
CPC ............ H04L 9/0866 (2013.01); H04L 9/085 (2013.01)
(58) Field of Classification Search
CPC ...... H04L 9/0866; H04L 9/085; H04L 9/3231
See application file for complete search history.

(56) References Cited

U.S. PATENT DOCUMENTS

| 2,017 A * | 3/1841 | Cherry | ...................... E02F 3/20 37/94 |
| 7,167,565 B2 * | 1/2007 | Rajasekaran | ........... H04L 9/085 380/278 |
| 7,257,844 B2 * | 8/2007 | Woodward | .............. H04L 9/085 380/231 |
| 9,129,536 B2 * | 9/2015 | Tkacik | .................. H04L 9/0866 |
| 10,305,690 B1 * | 5/2019 | Gehrmann | ............ H04L 63/061 |
| 11,362,822 B2 * | 6/2022 | Jain | ........................ H04L 9/0866 |
| 2006/0083372 A1 * | 4/2006 | Chang | ................... H04L 9/0866 380/44 |
| 2009/0177894 A1 * | 7/2009 | Orsini | ................... H04L 9/0822 713/193 |
| 2009/0310779 A1 * | 12/2009 | Lam | ...................... H04L 9/3231 380/46 |
| 2010/0106964 A1 * | 4/2010 | Hirata | ................. H04L 63/0861 726/5 |

(Continued)

OTHER PUBLICATIONS

Herder et al. "Trapdoor Computational Fuzzy Extractors and Stateless Cryptographically-Secure Physical Unclonable Functions" (2014).
(Continued)

Primary Examiner — J. Brant Murphy
(74) Attorney, Agent, or Firm — Leydig, Voit & Mayer, Ltd.

(57) ABSTRACT

A system comprising a first user device is provided. The first user device is configured to: obtain biometric registration data associated with a user; generate a secret key for the biometric registration data, wherein the secret key indicates an index translate point array; determine enrollment data for the user based on an index translate function, the biometric registration data, and the secret key, wherein the index translate function modifies entries of the biometric registration data based on the index translate point array; generate one or more cryptographic keys for the user based on the index translate point array; and provide, to a computing platform, ancillary information associated with the one or more cryptographic keys and the enrollment data.

20 Claims, 12 Drawing Sheets

(56) References Cited

U.S. PATENT DOCUMENTS

| | | | | |
|---|---|---|---|---|
| 2011/0246766 | A1* | 10/2011 | Orsini | H04L 67/1097 713/160 |
| 2014/0325309 | A1* | 10/2014 | Resch | H04L 9/085 714/763 |
| 2016/0105285 | A1* | 4/2016 | Jakobsson | H04L 9/0866 713/186 |
| 2016/0253521 | A1* | 9/2016 | Esmailzadeh | G06F 21/602 726/4 |
| 2017/0109512 | A1* | 4/2017 | Bower | G06F 21/602 |
| 2017/0250816 | A1* | 8/2017 | Popa | G06F 21/62 |
| 2017/0373861 | A1 | 12/2017 | Jain | |
| 2018/0013557 | A1* | 1/2018 | Jain | H04L 9/085 |
| 2020/0036707 | A1* | 1/2020 | Callahan | H04L 67/53 |
| 2020/0042684 | A1* | 2/2020 | Gehrmann | G06F 21/32 |
| 2020/0235932 | A1* | 7/2020 | Gehrmann | H04L 63/0435 |
| 2020/0244451 | A1* | 7/2020 | Herder, III | H04L 63/0861 |
| 2020/0267144 | A1* | 8/2020 | Wagner | G06Q 20/40145 |
| 2021/0152360 | A1* | 5/2021 | Gehrmann | H04L 9/3242 |
| 2021/0367786 | A1* | 11/2021 | Sheets | H04L 9/0894 |
| 2024/0039718 | A1* | 2/2024 | Nara | G06F 21/60 |
| 2025/0111367 | A1* | 4/2025 | Kopf | H04L 9/3231 |

OTHER PUBLICATIONS

Herder et al. "Public Key Cryptosystems with Noisy Secret Keys" (2017).

"How can one securely generate an asymmetric key pair from a short passphrase?" https://crypto.stackexchange.com/questions/1662/how-can-one-securely-generate-an-asymmetric-key-pair-from-a-short-passphrase/1665#1665 (2012).

Johnson, Robert A. "The Unisys Stealth Solution and SecureParser: A New Method for Securing and Segregating Network Data," Unisys Corporation (2008).

Lewin, Michael "All About XOR-accu.org" *Overload Journal*, #109, (Jun. 2012).

Monrose et al., "Cryptographic Key Generation From Voice," *IEEE Symposium on Security and Privacy* (May 2001).

O'Hare et al. "The New Paradigm for Cyber Security," *Proceedings Magazine* (Mar. 2015).

Parmar et al., "A novel Approach for Verifiable Secret Sharing by Using a One Way Hash Function" $10^{th}$ Natl. Workshop on Cryptology (Sep. 2-4, 2010).

"Pseudorandom number generator" Wikipedia (Feb. 14, 2023).

Reza Key Encoding & Decoding, EyeVerify Inc. (2015).

"Secret Sharing," *Wikipedia* (2018).

Teoh et al. "Personalised Cryptographic Key Generation Based on FaceHashing" *Computers & Security*, 23, 606-614 (2004).

"Threshold Cryptosystem with a Required Share" https://crypto.stackexchange.com/questions/11529/threschold-cryptosystem-wtih-a-required-share (2013).

You et al., "A Cryptographic Key Binding Method Based on Fingerprint Features and the Threshold Scheme," *Int. J. Advancements in Computing Tech.*, 3(4), 21-31 (May 2011).

* cited by examiner

|   | 0 | 1 | 2 | 3 | 4 | 5 | 6 | 7 | 8 | 9 |
|---|---|---|---|---|---|---|---|---|---|---|
| 0 | 0.012431 | -0.088576 | -0.004653 | 0.012781 | -0.072257 | 0.034941 | 0.004855 | 0.034713 | -0.026711 | -0.125175 |
| 1 | 0.004855 | 0.034713 | -0.026711 | -0.125175 | 0.012431 | -0.088576 | -0.004653 | 0.012781 | -0.072257 | 0.034941 |
| 2 | -0.034888 | -0.068527 | -0.090471 | 0.077667 | -0.063012 | 0.064949 | 0.054598 | 0.012781 | -0.072257 | -0.020709 |
| 3 | 0.137384 | -0.079070 | -0.059947 | -0.014162 | -0.052859 | -0.013526 | -0.139100 | -0.106961 | -0.030295 | 0.002940 |
| 4 | -0.106961 | -0.030295 | -0.020709 | -0.034888 | -0.068527 | -0.090471 | 0.077667 | 0.017482 | -0.016793 | 0.054598 |
| 5 | -0.016793 | 0.002940 | 0.137384 | -0.079070 | -0.059947 | -0.014162 | -0.052859 | -0.063012 | 0.064949 | 0.017482 |
| 6 | -0.068527 | -0.090471 | 0.077667 | -0.063012 | 0.064949 | 0.054598 | -0.106961 | -0.030295 | -0.139100 | -0.034888 |
| 7 | -0.022623 | 0.067783 | -0.120886 | -0.025244 | 0.051074 | -0.027295 | 0.056076 | -0.097284 | -0.017222 | -0.082029 |

| | 0 | 1 | 2 | 3 | 4 | 5 | 6 | 7 | 8 | 9 |
|---|---|---|---|---|---|---|---|---|---|---|
| 0 | 0.005336 | -0.049665 | -0.001037 | 0.059148 | 0.012929 | 0.074937 | -0.007849 | -0.035741 | -0.006088 | -0.012635 |
| 1 | -0.012635 | 0.049665 | -0.049665 | -0.001037 | 0.059148 | 0.012929 | 0.074937 | -0.007849 | -0.035741 | -0.006088 |
| 2 | -0.006088 | -0.012635 | 0.005336 | -0.049665 | -0.001037 | 0.059148 | 0.012929 | 0.074937 | -0.007849 | -0.035741 |
| 3 | -0.035741 | -0.006088 | -0.012635 | 0.005336 | -0.049665 | -0.001037 | 0.059148 | 0.012929 | 0.074937 | -0.007849 |
| 4 | -0.007849 | -0.035741 | -0.006088 | -0.012635 | 0.005336 | -0.049665 | -0.001037 | 0.059148 | 0.012929 | 0.074937 |
| 5 | 0.074937 | -0.007849 | -0.035741 | -0.006088 | -0.012635 | 0.005336 | -0.049665 | -0.001037 | 0.059148 | 0.012929 |
| 6 | 0.012929 | 0.074937 | -0.007849 | -0.035741 | -0.006088 | -0.012635 | 0.005336 | -0.049665 | -0.001037 | 0.059148 |
| 7 | 0.059148 | 0.012929 | 0.074937 | -0.007849 | -0.035741 | -0.006088 | -0.012635 | 0.005336 | -0.049665 | -0.001037 |
| 8 | -0.001037 | 0.059148 | 0.012929 | 0.074937 | -0.007849 | -0.035741 | -0.006088 | -0.012635 | 0.005336 | -0.049665 |
| 9 | -0.049665 | -0.001037 | 0.059148 | 0.012929 | 0.074937 | -0.007849 | -0.035741 | -0.006088 | -0.012635 | 0.005336 |

| | 0 | 1 | 2 | 3 | 4 | 5 | 6 | 7 | 8 | 9 |
|---|---|---|---|---|---|---|---|---|---|---|
| 0 | 0.007376 | -0.002426 | 0.009873 | 0.003491 | -0.006863 | -0.000661 | -0.015973 | 0.003091 | 0.000570 | -0.007040 |
| 1 | 0.015973 | 0.003091 | 0.000570 | 0.007040 | 0.007376 | 0.002426 | 0.009873 | 0.003491 | 0.006863 | 0.000661 |
| 2 | 0.015798 | 0.007740 | -0.005687 | 0.006023 | -0.009596 | -0.002834 | -0.003679 | -0.008217 | 0.000693 | -0.008803 |
| 3 | -0.002720 | -0.012446 | -0.000661 | -0.010391 | 0.003863 | 0.019675 | -0.004099 | 0.007376 | -0.005367 | -0.009232 |
| 4 | -0.008217 | 0.000693 | -0.008803 | 0.015798 | 0.007740 | -0.005687 | 0.006023 | -0.009596 | -0.002834 | -0.003679 |
| 5 | -0.005367 | -0.009232 | 0.002720 | -0.012446 | -0.000661 | -0.010391 | 0.003863 | 0.019675 | -0.004099 | 0.007376 |
| 6 | 0.007740 | -0.005687 | 0.006023 | -0.009596 | -0.002834 | -0.003679 | -0.008217 | 0.000693 | -0.008803 | 0.015798 |
| 7 | -0.002062 | 0.015426 | -0.005276 | 0.000693 | -0.011744 | -0.003307 | 0.006969 | -0.011269 | 0.006023 | -0.004014 |

SYSTEMS AND METHODS FOR GENERATING AND USING BIOMETRIC SECRET KEYS

BACKGROUND

Biometrics may be used for authentication. For example, biometric identifiers or features, which are distinctive, measurable characteristics used to label and describe individuals, may be used to authenticate the user for one or more services. For instance, during the enrollment process for a service, a user device may obtain a biometric identifier such as a voice recording of the user and store the biometric identifier in memory and/or provide the biometric identifier to a server. Subsequently, when attempting to access the service, the user device may obtain another biometric identifier of the user and the user device and/or the server may compare the previous biometric identifier with the new biometric identifier to determine whether the user is authenticated. However, this process of template matching (e.g., simply matching a previous biometric identifier with a new biometric identifier) may be bypassed in certain scenarios such as when a malicious entity may attempt to spoof the user's voice. In addition, one or more of the biometric identifiers of the user may be stored in a location, which may lead to security issues (e.g., the malicious entity may gain unauthorized access to the biometric identifier of the user). Further, biometric identifiers (e.g., biometric features) are noisy and may change based on environment and/or other settings, which may cause the template matching to fail. Accordingly, there remains a technical need to design a safer and more reliable approach for authentication of a user.

SUMMARY

In some examples, the present application provides a method and system for generating and using biometric secret keys. For example, a user device may obtain one or more biometric identifiers such as, but not limited to, a fingerprint of the user, a facial scan of the user, a voice recording of the user, an iris recognition of the user, and/or other types of biometric identifiers that are used to identify and/or authenticate a user. The user device may generate a biometric key (e.g., a biometric secret key) for the user. Using an index translate function, the user device may generate enrollment data for the user based on re-arranging entries from the biometric identifier with the biometric key. The user device may enroll the user into a service based on providing information associated with the enrollment data to a computing platform. Afterwards, when attempting to access the service again, the same user device or a different user device may use the previously generated enrollment data to authenticate the user. For instance, the user device may obtain new biometric data for the user and recreate the biometric secret key using the index translate function, the new biometric data, and the enrollment data from the user. Using the recreated secret key, the user device may authenticate the user for the service. This will be described in further detail below.

In one aspect, a system comprising a first user device is provided. The first user device is configured to: obtain biometric registration data associated with a user; generate a secret key for the biometric registration data, wherein the secret key indicates an index translate point array; determine enrollment data for the user based on an index translate function, the biometric registration data, and the secret key, wherein the index translate function modifies entries of the biometric registration data based on the index translate point array; generate one or more cryptographic keys for the user based on the index translate point array; and provide, to a computing platform, ancillary information associated with the one or more cryptographic keys and the enrollment data.

Examples may include one of the following features, or any combination thereof. For instance, in some examples, the biometric registration data comprises a biometric user array indicating a biometric representation of the user, wherein the biometric representation of the user is associated with a fingerprint of the user or a facial recognition image of the user.

In some instances, the first user device is further configured to obtain second biometric data that is different from the biometric registration data associated with the user, and wherein determining the enrollment data for the user comprises: determining first index translate outputs based on the index translate point array, the biometric registration data, and the index translate function; determining second index translate outputs based on the second biometric data and the index translate function; and generating the enrollment data based on the first index translate outputs and the second index translate outputs.

In some variations, generating the enrollment data comprises: generating intermediate enrollment data using the first index translate outputs and the second index translate outputs; and generating the enrollment data based on using a sparsify function and the intermediate enrollment data, wherein the sparsify function resets at least one entry from the intermediate enrollment data to zero.

In some instances, generating the intermediate enrollment data is based on a noise vector.

In some examples, generating the one or more cryptographic keys comprises generating a private and public key pair comprising a public key and a private key, and wherein providing the ancillary information comprises providing, to the computing platform, the public key and the enrollment data.

In some variations, the first user device is further configured to: subsequent to providing the public key and the enrollment data to the computing platform, delete the secret key and the private and public key pair; receive, from the computing platform, the enrollment data; obtain new biometric data associated with the user; and recreate the secret key based on the received enrollment data, the new biometric data, and the index translate function.

In some instances, recreating the secret key comprises: determining one or more index translated vectors based on the index translate function and the new biometric data; determining a plurality of enrollment-based index translated vectors based on the one or more index translated vectors and the enrollment data; and obtaining the recreated secret key based on a mathematical operation and the plurality of enrollment-based index translated vectors.

In some examples, the first user device is further configured to: re-generate the private and public key pair based on the recreated secret key; encrypt an element using the private key from the re-generated private and public key pair; and provide the encrypted element to the computing platform.

In some variations, the system further comprises the computing platform, wherein the computing platform is configured to: authenticate the user based on decrypting the encrypted element using the public key; and provide an indication indicating the authentication of the user to the first user device.

In some instances, the system further comprises: a second user device configured to: receive, from the computing platform, the enrollment data; obtain new biometric data associated with the user; and recreate the secret key based on the received enrollment data, the new biometric data, and the index translate function.

In some variations, the second user device is further configured to: re-generate the private and public key pair based on the recreated secret key; encrypt an element using the private key from the re-generated private and public key pair; and provide the encrypted element to the computing platform, and the system further comprises the computing platform, wherein the computing platform is configured to: authenticate the user based on decrypting the encrypted element using the public key; and provide an indication indicating the authentication of the user to the second user device.

In some examples, the second user device is further configured to: re-generate the private and public key pair based on the recreated secret key; encrypt an element using the private key from the re-generated private and public key pair; and provide the encrypted element to the computing platform, and the system further comprises the computing platform, wherein the computing platform is configured to: authenticate the user based on decrypting the encrypted element using the public key; and provide an indication indicating the authentication of the user to the second user device.

In some variations, generating the one or more cryptographic keys comprises generating an encryption key based on the index translate point array, and wherein providing the ancillary information comprises: generating encrypted sensitive data associated with the user based on the encryption key; and providing the encrypted sensitive data and the enrollment data to the computing platform, and wherein the computing platform is configured to store the encrypted sensitive data and the enrollment data.

In some instances, the first user device is further configured to: subsequent to providing the encrypted sensitive data and the enrollment data to the computing platform, delete the secret key and the encryption key; receive, from the computing platform, the encrypted sensitive data and the enrollment data; obtain new biometric data associated with the user; and recreate the secret key based on the received enrollment data, the new biometric data, and the index translate function.

In some examples, the first user device is further configured to: re-generate the encryption key based on the recreated secret key; decrypt the encrypted sensitive data using the re-generated encryption key; and utilize the decrypted sensitive data for one or more tasks.

In another aspect, a method is provided. The method comprises: obtaining, by a user device, biometric registration data associated with a user; generating, by the user device, a secret key for the biometric registration data, wherein the secret key indicates an index translate point array; determining, by the user device, enrollment data for the user based on an index translate function, the biometric registration data, and the secret key, wherein the index translate function modifies entries of the biometric registration data based on the index translate point array; and generating, by the user device, one or more cryptographic keys for the user based on the index translate point array.

Examples may include one of the following features, or any combination thereof. For instance, in some examples, generating the one or more cryptographic keys comprises generating an encryption key based on the index translate point array, and wherein the method further comprises: encrypting sensitive data associated with the user using the encryption key; and storing the enrollment data and encrypted sensitive data associated with the user in memory of the user device.

In some instances, the method further comprises: subsequent to storing the enrollment data and the encrypted sensitive data, deleting the encryption key; retrieving, from the memory of the user device, the encrypted sensitive data and the enrollment data; obtaining new biometric data associated with the user; and recreating the secret key based on the retrieved enrollment data, the new biometric data, and the index translate function.

In some examples, the method further comprises: re-generating the encryption key based on the recreated secret key; decrypting the encrypted sensitive data using the re-generated encryption key; and utilizing the decrypted sensitive data for one or more tasks.

In yet another aspect, a non-transitory computer-readable medium having processor-executable instructions stored thereon is provided. The processor-executable instructions, when executed, facilitate: obtaining biometric registration data associated with a user; generating a secret key for the biometric registration data, wherein the secret key indicates an index translate point array; determining enrollment data for the user based on an index translate function, the biometric registration data, and the secret key, wherein the index translate function modifies entries of the biometric registration data based on the index translate point array; and generating one or more cryptographic keys for the user based on the index translate point array.

All examples and features mentioned herein may be combined in any technically possible way.

BRIEF DESCRIPTION OF THE DRAWINGS

The subject technology will be described in even greater detail below based on the exemplary figures, but is not limited to the examples. All features described and/or illustrated herein can be used alone or combined in different combinations. The features and advantages of various examples will become apparent by reading the following detailed description with reference to the attached drawings which illustrate the following:

FIG. 6 shows an exemplary data structure of the enrollment data in accordance with one or more examples of the present application.

FIG. 7 shows an exemplary data structure of the index translated vector in accordance with one or more examples of the present application.

FIG. 8 shows an exemplary data structure of the plurality of index translated vectors in accordance with one or more examples of the present application.

DETAILED DESCRIPTION

Examples of the presented application will now be described more fully hereinafter with reference to the accompanying FIGs., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 1:
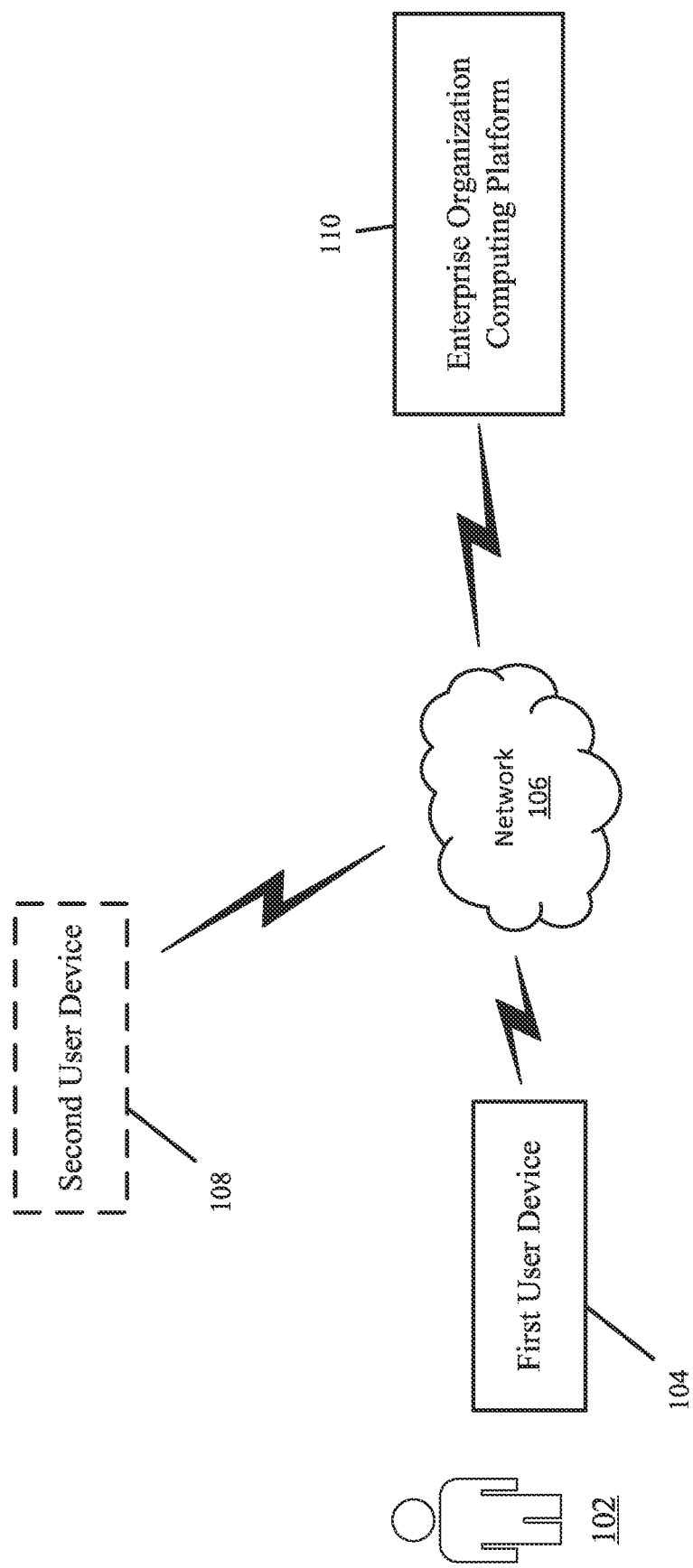
FIG. 1 is a simplified block diagram depicting an exemplary computing environment in accordance with one or more examples of the present application.

Systems, methods, and computer program products are herein disclosed that provide for generating and using biometric secret keys. FIG. 1 is a simplified block diagram depicting an exemplary environment in accordance with an example of the present application. The environment 100 includes a user 102, a first user device 104 (e.g., a computing device), a network 106, a second user device 108, and an enterprise organization computing platform 110 ("computing platform 110"). Although the entities within environment 100 may be described below and/or depicted in the FIGs. as being singular entities, it will be appreciated that the entities and functionalities discussed herein may be implemented by and/or include one or more entities. For instance, the enterprise organization computing platform 110 may include a plurality of computing devices, systems, platforms, and/or servers that are spread across multiple different geographical locations and communicate with each other using direct connections and/or the network 106.

The entities within the environment 100 such as the first user device 104, the second user device 108, and the enterprise organization computing platform 110 may be in communication with other devices and/or systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100.

User 102 may operate, own, and/or otherwise be associated with the first user device 104 and/or the second user device 108. For instance, the first user device 104 may perform one or more functions or tasks for an enterprise organization and/or the user 102. For example, the enterprise organization may provide one or more services using one or more software and/or web applications. To access the services, the first user device 104 may obtain information from the user 102 to enroll the user 102 into the services provided by the enterprise organization and/or authenticate the user 102 after enrollment. For example, the first user device 104 may obtain biometric registration data associated with the user 102. The biometric registration data may indicate a biometric representation (e.g., a biometric feature or identifier) of the user 102. For instance, the biometric representation may include, but is not limited to, a facial recognition image of the user, a fingerprint of the user, an iris scan of the user, and/or a voice recording of the user. The first user device 104 may generate enrollment data and use the enrollment data to enroll the user 102 into the service based on the biometric representation. For example, the first user device 104 may provide the enrollment data to the enterprise computing platform 110 to enroll the user 102 into the service provided by the enterprise computing platform 110. This will be described below.

In some instances, after enrolling the user 102 into the service, the first user device 104 may be used to authenticate the user. For instance, the first user device 104 may obtain a second biometric representation of the user 102. Additionally, and/or alternatively, the first user device 104 may obtain the enrollment data from the enterprise computing platform 110. Based on the enrollment data and the second biometric representation, the first user device 104 may use a recreate process to authenticate the user 102 for the service.

In other instances, the first user device 104 may perform the enrollment and a second, separate user device (e.g., the second user device 108) may perform the authentication of the user. For example, in some variations, the user 102 may use the first user device 104 to perform the enrollment. Then, a second user device 108 associated with the user 102 may be used to perform the authentication (e.g., authenticate the user 102 for the service based on the enrollment data and the second biometric representation).

The second user device 108 is shown in FIG. 1 using a dotted box, which denotes that the second user device 108 is optional. When present, the second user device 108 performs the authentication as described above. When absent, the first user device 104 may perform the enrollment and authentication.

The first user device 104 is and/or includes, but is not limited to, a desktop, laptop, tablet, mobile device (e.g., smartphone device, or other mobile device), smart watch, an internet of things (IOT) device, or any other type of computing device that generally comprises one or more communication components, one or more processing components, and one or more memory components. The second user device 108 is and/or includes, but is not limited to, a desktop, laptop, tablet, mobile device (e.g., smartphone device, or other mobile device), smart watch, an internet of things (IOT) device, or any other type of computing device that generally comprises one or more communication components, one or more processing components, and one or more memory components. The first user device 104 and/or the second user device 108 may be able to execute one or more software applications and/or programs owned, managed, serviced, and/or associated with the enterprise organization.

The enterprise organization computing platform 110 is a computing platform that facilitates the enrollment and/or authentication of the user 102 for one or more services owned, operated, serviced, managed, and/or otherwise associated with the enterprise organization. The enterprise organization may be any type of corporation, company, organization, and/or other institution that provides one or more goods and/or services. For instance, the enterprise organization may provide multiple different services such as a grocery pick-up service, a retail service, a prescription pick-up service (e.g., the enterprise organization may provide prescriptions/medications to the user 102), an insurance service (e.g., the enterprise organization may provide insurance to the user 102), a streaming service (e.g., the enterprise organization may provide for streaming videos, television shows, and so on to the user 102), and/or other services.

The user 102 may seek to enroll into and access one or more services provided by the enterprise organization. As such, the first user device 104 may provide enrollment data to the enterprise organization computing platform 110. The enterprise organization computing platform 110 may enroll the user 102 for the service. For instance, the enterprise organization computing platform 110 may store the enrollment data into a database and/or repository associated with the enterprise organization computing platform 110. Then, the first user device 104 and/or the second user device 108 may seek to authenticate the user 102. The enterprise organization computing platform 110 may provide the stored enrollment data back to the first and/or second user devices 104, 108. Using the enrollment data and/or other information, the first and/or second user device 104, 108 may authenticate the user 102 using a recreate process. This will be described in further detail below.

The enterprise organization computing platform 110 includes one or more computing devices, computing platforms, systems, servers, and/or other apparatuses capable of performing tasks, functions, and/or other actions for the enterprise organization. The enterprise organization computing platform 110 may be implemented using one or more computing platforms, devices, servers, and/or apparatuses. In some variations, the enterprise organization computing platform 110 may be implemented as engines, software functions, and/or applications. In other words, the functionalities of the enterprise organization computing platform 110 may be implemented as software instructions stored in storage (e.g., memory) and executed by one or more processors.

It will be appreciated that the exemplary environment depicted in FIG. 1 is merely an example, and that the principles discussed herein may also be applicable to other situations—for example, including other types of institutions, organizations, devices, systems, and network configurations. For example, in some variations, the functionalities of the computing platform 110 may be separated into multiple different entities. For instance, the computing platform 110 may have a first system that performs the enrollment and/or authentication process for the user 102. The computing platform 110 may have a second system that manages and/or provides the services to the user 102 after authentication. Additionally, and/or alternatively, a separate computing system that is not associated with the computing platform 110 may provide the service to the user 102 after authentication.

Figure 2:
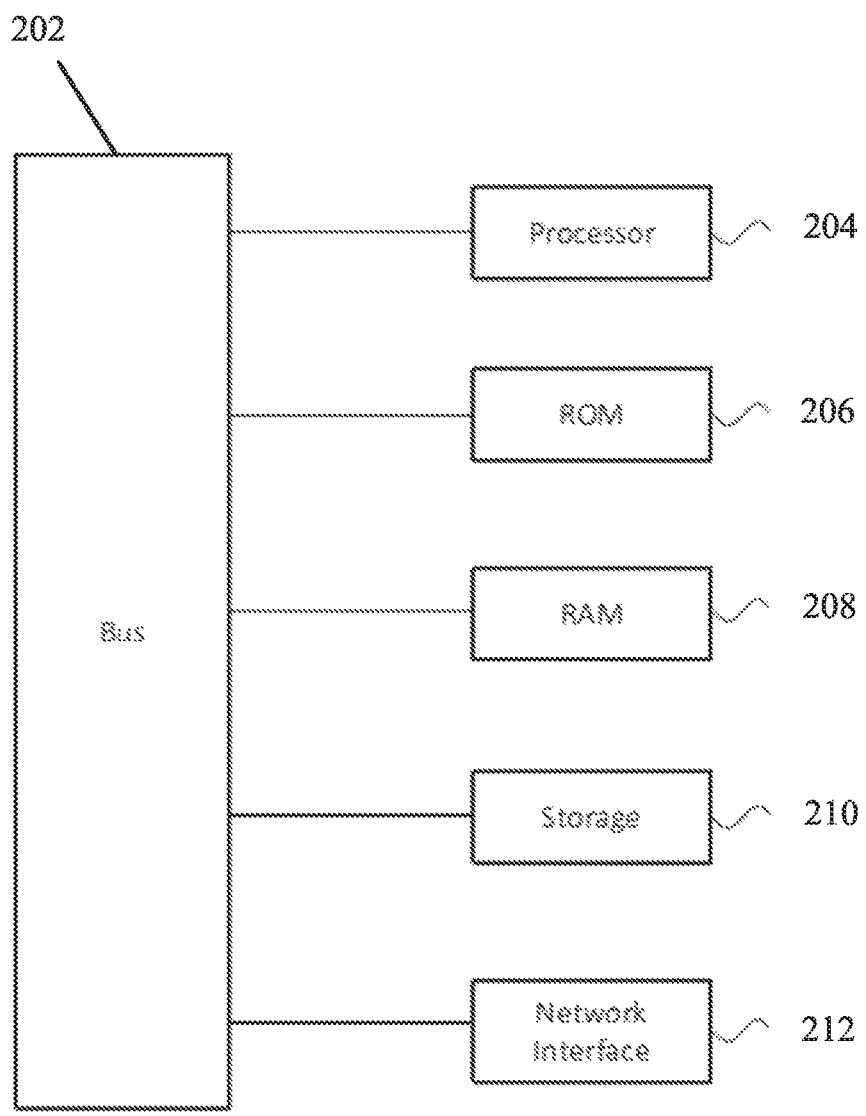
FIG. 2 is a simplified block diagram of one or more devices or systems within the exemplary environment of FIG. 1.

FIG. 2 is a block diagram of an exemplary system and/or device 200 (e.g., the first user device 104, the second user device 108, and/or the enterprise organization computing platform 110) within the environment 100. The device/system 200 includes one or more processors 204, such as one or more CPUs, controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component, server, device, computing platform, and/or computing apparatus within the device/system 200. Additionally, and/or alternatively, the device/system 200 may further include components that might not be included within every entity of environment 100.

Figure 3:
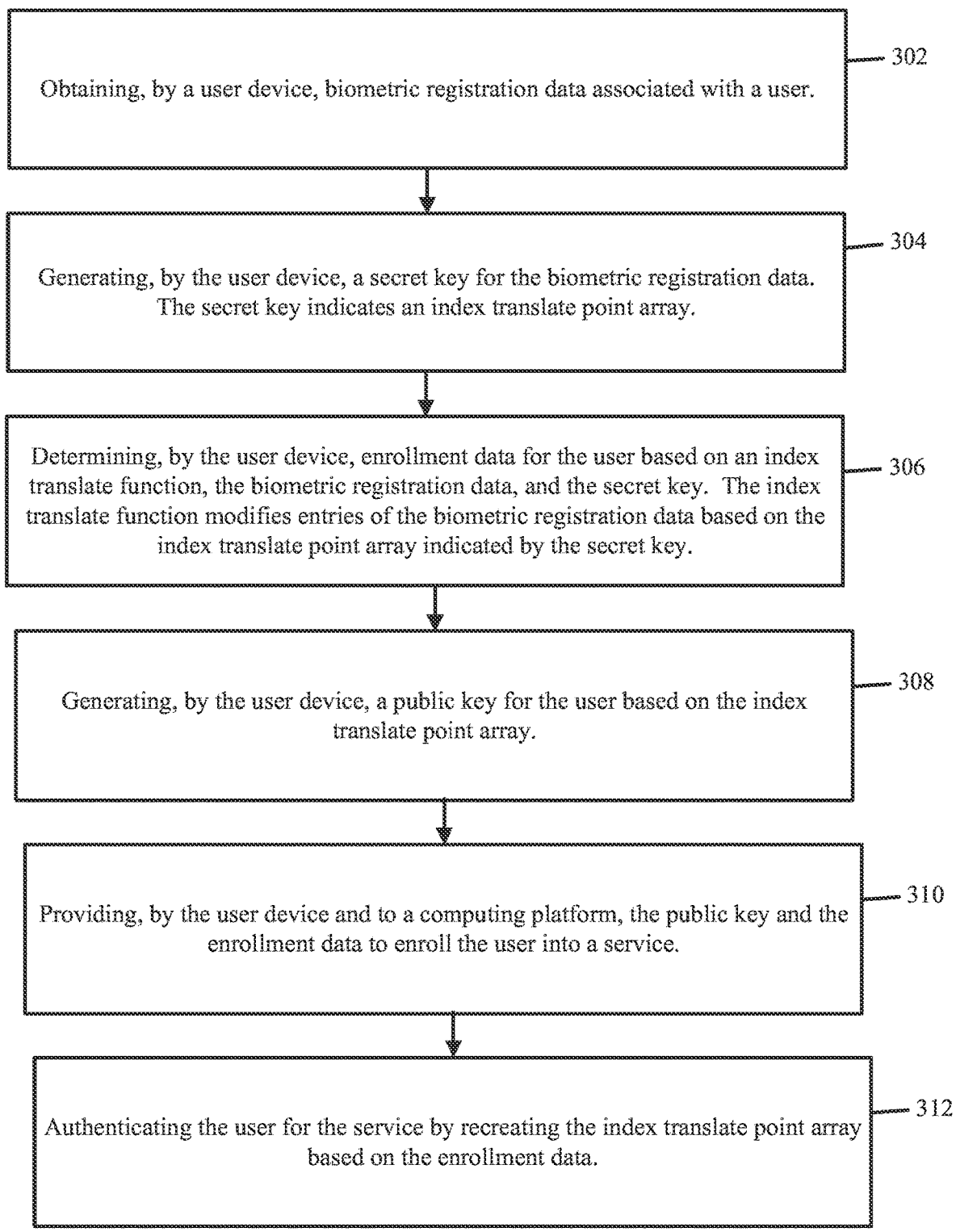
FIG. 3 is an exemplary process for generating and using biometric secret keys in accordance with one or more examples of the present application.

FIG. 3 is an exemplary process 300 for generating and using biometric secret keys in accordance with one or more examples of the present application. The process 300 may be performed by the first user device 104 and/or the second user device 108 of environment 100 shown in FIG. 1. It will be recognized that any of the following blocks may be performed in any suitable order, and that the process 300 may be performed in any suitable environment. The descriptions, illustrations, and processes of FIG. 3 are merely exemplary and the process 300 may use other descriptions, illustrations, and processes for generating and using biometric secret keys.

At block 302, a user device (e.g., the first user device 104 and/or the second user device 108) obtains biometric registration data associated with a user 102. For example, the user 102 may seek to enroll into and/or access a service owned, operated, managed, and/or otherwise associated with an enterprise organization (e.g., the user 102 may use the user device to download a software application associated with the enterprise organization). To enroll into the service, the user device may request and obtain one or more biometric features (e.g., biometric identifiers) of the user 102. For instance, as mentioned above, the biometric features may include, but is not limited to, a fingerprint scan of the user 102, a voice recording or voiceprint of the user 102, an iris scan of the user 102, and/or a facial scan of the user 102. In some instances, the biometric feature may be a facial scan or fingerprint of the user 102. For example, the user device may use a device (e.g., an image capturing device such as a camera) to obtain (e.g., capture) an image of the user's face. The user device may use one or more methods, processes, and/or algorithms to convert the obtained image to the biometric registration data (e.g., "Bpos"). For instance, in some examples, the user device may use FaceNet to convert the obtained image into the biometric registration data (e.g., create a vector and/or array for the image of the user's face). In some variations, the biometric registration data may be a vector and/or array. For example, the user device may use the one or more methods, processes, and/or algorithms to convert the obtained image into a vector such as [1, 3, 6, 9].

In other words, in some examples, the biometric registration data may be a d-dimensional array (e.g., a vector of values such as integer and/or non-integer values) that is unique for the user 102 as each user's biometric features are different. Below, it is described that the biometric registration data is a single dimensional array. In other words, the biometric registration data is a vector of values. However, in other examples, the biometric registration data may be another type of dimensional array such as a two dimensional array, a three dimensional array, and so on. For example, based on the biometric features of the user 102, the user device may convert the feature to a vector of values. Therefore, using the same algorithm, the user device may obtain a first vector for a first user that is completely different from a second vector for a second user since the first user's facial scan or voiceprint is different from the second user's facial scan or voiceprint.

At block 304, the user device generates a secret key for the biometric registration data. The secret key indicates an index translate point array (e.g., an index translate point array, an index translate point vector, and/or a true index translate point array/vector). The index translate point array is a d-dimensional array. Below, it is described that the index translate point array is a single dimensional array. In other words, the index translate point array is a vector of values (e.g., an index translate point vector that is only positive integers). However, in other examples, the index translate point array may be another type of dimensional array such as a two dimensional array, a three dimensional array, and so on. In some instances, the secret key ("Tpos") may be a vector of values, and the user device may generate the secret key (e.g., the index translate point vector) using one or more methods, processes, and/or algorithms. For instance, the user device may use a random number generator (RNG) to generate the index translate point vector.

In some instances, the user device may determine and/or obtain parameters for the generation of the secret key. For instance, the user device may determine the number of entries (e.g., the number of vectors, N) and the dimensions (e.g., d). The dimensions may indicate the maximum possible value for each of the entries. The user device may determine the dimensions based on the biometric registration data (e.g., the dimensions of the secret key may be based on the dimensions of "Bpos" or the biometric registration data). For example, the user device may determine the number of entries for the secret key is "3" and the dimension is "4". Therefore, using a RNG, the user device may determine the secret key/the index translate point vector as [1, 3, 2] or [1, 4, 2]. In other words, the number of entries, N, may indicate the length of the vector and the dimensions may indicate the maximum value that can be selected by the RNG (e.g., between value "1" to "4").

In some variations, in addition to obtaining and/or generating the biometric registration data and the secret key, the user device may further obtain negative biometric data (e.g., second biometric data and/or "Bneg") and a negative index translate point vector (e.g., "Tneg"). The negative biometric data is different from the biometric registration data from the user 102. For example, the negative biometric data may be obtained through any process, algorithm, or method such that the negative biometric data is at least slightly different from the biometric registration data from the user 102. For instance, in some examples, the negative biometric data may be for a different user. For example, the enterprise organization computing platform 110 may store a plurality of negative biometric data associated with a plurality of different users. Each of the negative biometric data may be obtained from biometric features (e.g., biometric identifiers) from a user that is different from the user 102. For instance, the enterprise organization computing platform 110 or another system/device may perform one or more methods, processes, and/or algorithms (e.g., algorithms similar to or the same as the algorithms described in block 302 above) to obtain the negative biometric data from the biometric features of the different user. Afterwards, the enterprise organization computing platform 110 may store the negative biometric data in memory (e.g., a database and/or repository), and provide the negative biometric data to the user device during the enrollment phase for the new service.

In other examples, the negative biometric data may be based on biometric registration data obtained in block 302. For example, the user device may perform one or more methods, processes, and/or algorithms that modifies, alters, obfuscates, and/or otherwise changes the biometric registration data into the negative biometric data. For instance, the user device may move and/or change certain entries around within the biometric registration data to generate the negative biometric data. Additionally, and/or alternatively, the user device may perform one or more mathematical functions to generate the negative biometric data.

The negative index translate point vector may be a vector that is associated with the negative biometric data. For example, the user device may generate the negative index translate point vector using a similar algorithm that is used to generate the secret key (e.g., the index translate point vector) in block 304. For instance, the user device may use an RNG to generate the negative index translate point vector.

In other words, using blocks 302 and 304, the user device may obtain and/or generate biometric registration data associated with the user 102, negative biometric data, a secret key (e.g., the index translate point vector), and/or a negative index translate point vector. The biometric registration data and the secret key may be directly associated with the user 102. The negative biometric data and the negative index translate point vector might not be directly associated with the user 102 (e.g., the negative biometric data may be based on biometric features from a different user and/or may be modified from the biometric registration data).

At block 306, the user device determines enrollment data for the user 102 based on an index translate function, the biometric registration data, and the secret key. The index translate function modifies entries of the biometric registration data based on the index translate point array (e.g., the index translate point vector) indicated by the secret key. For example, the user device may determine the enrollment data based on modifying (e.g., re-arranging and/or performing one or more operations or processes) the entries of the biometric registration data (e.g., the vector indicated by the biometric registration data) using the index translate point vector.

In some instances, the enrollment data may be and/or include a matrix and the index translate function may modify, re-arrange, and/or shift entries (e.g., indices) within the biometric registration data to generate or populate the matrix. For example, the biometric registration data for the user 102 may be a vector such as [0, 2, 6, 3, 5]. The index translate point vector may be another vector such as [1, 2, 4]. Therefore, the enrollment data for the matrix may include 5 columns (e.g., the number of entries from the biometric registration data) and 3 rows (e.g., the number of entries of the index translate point vector). Using the index translate function, the user device may re-arrange (e.g., shift) the entries of the biometric registration data based on the index translate point vector. For instance, for the first row of the matrix may be based on the first entry of the index translate point vector (e.g., "1"). For the first row, the user device may shift the entries of the biometric registration data based on the first entry of the index translate point vector, "1", to obtain [5, 0, 2, 6, 3]. Similarly, for the second row, the user device may shift the entries based on the second entry, "2", to obtain [3, 5, 0, 2, 6]. For the third row, the user device may obtain [2, 6, 3, 5, 0]. Thus, using the index translate function, the biometric registration data, and the index translate point vector, the user device may obtain the enrollment data indicating a matrix with the first row [5, 0, 2, 6, 3], the second row [3, 5, 0, 2, 6], and the third row [2, 6, 3, 5, 0].

The above example is merely exemplary and the index translate function may operate differently to generate the enrollment data. For example, in another instance, the generated matrix may be transposed. For instance, the columns of the matrix may be associated with the number of entries of the index translate point vector and the rows of the matrix may be associated with the entries of the biometric registration data.

In some variations, the index translate function may re-arrange and/or perform operations for each of the entries of biometric registration data, the index translate point vector, and/or the enrollment data. For instance, in addition to and/or as an alternative of shifting or re-arranging the entries of the biometric registration data based on the index translate point vector, the user device may further use the index translate function to make additional modifications to the matrix of the enrollment data, the biometric registration data, and/or the index translate point vector. For instance, referring to the example above, for the first row, after shifting the entries, the user device may perform another operation such as adding each entry by "1" or multiplying each entry by "2" (e.g., the first row may be [6, 1, 3, 7, 4] or [10, 0, 4, 12, 6]). The user device may use the modified first row after the shifting and adding/multiplying operations for the matrix of the enrollment data. Then, the user device may modify the second and third rows similarly to generate the matrix.

In some examples, the user device may use the biometric registration data and the index translate point vector (e.g., the secret key) to generate the matrix for the enrollment data. Additionally, and/or alternatively, the user device may further use the negative biometric data (e.g., Bneg) and the negative index translate point vector (e.g., Tneg) to generate the matrix for the enrollment data. For instance, the user device may generate two matrices. The user device may generate the first matrix based on the biometric registration data, the index translate point vector, and the index translate function as described above. Further, the user device may generate a second matrix based on the negative biometric data, the negative index translate point vector, and the index translate function. For instance, using the index translate function described above, the user device may generate a second matrix using the negative biometric data and the negative index translate point vector (e.g., the biometric registration data may be substituted for the negative biometric data and the index translate point vector may be substituted with the negative index translate point vector when performing the index translate function described above).

The user device may determine the enrollment data based on the two matrices. For instance, the user device may perform an operation such as an addition operation that adds the entries of the two matrices together. Based on performing the operation, the user device may determine the matrix for the enrollment data. Additionally, and/or alternatively, the user device may perform any other type of operation, process, or algorithm using the two matrices to obtain the enrollment data. In other words, the user device may obtain first index translate outputs (e.g., entries associated with the first matrix that is obtained based on the biometric registration data and the index translate point vector/the secret key) and second index translate outputs (e.g., entries associated with the second matrix that is obtained based on the negative biometric data and the negative index translate point vector). The user device may generate the enrollment data using the first index translate outputs and the second index translate outputs.

Additionally, and/or alternatively, the user device may use another array (e.g., a noise array, "$p_i$") to obfuscate the enrollment data further. The noise array may be a vector (e.g., a noise vector). For instance, the user device may determine the enrollment data based on the first and/or second index translate outputs (e.g., the first and/or second matrices described above) and the noise array. For example, the user device may determine or generate intermediate enrollment data (e.g., first intermediate enrollment data) based on the first and/or second matrices (e.g., by adding the first matrix and the second matrix together). Subsequently, the user device may determine the enrollment data based on the first intermediate enrollment data and the noise array. For instance, the user device may perform a multiplication operation (e.g., a matrix multiplication operation) using the first intermediate enrollment data and the noise array to determine the enrollment data.

In other words, to provide further security to the user 102 to ensure that a malicious entity is unable to gain access to the user's account, the user device may use the second matrix and/or the noise array to introduce additional noise to the enrollment data. By using the second matrix and/or the noise array, this makes it even more difficult for a malicious entity to be able to re-obtain the secret key of the user 102.

Additionally, and/or alternatively, the user device may use a sparsify function for the enrollment data. For example, the sparsify function may reset and/or populate random entries within the enrollment data to be zero using a sparsify value. For instance, let each entry of the matrix be identified by a matrix entry number (e.g., a value 1-15 for the matrix described above with 15 total entries). The sparsify value may indicate the number of random entries from the total number of entries of the matrix to be reset to zero. For example, if the sparsify value is 3, then the user device may set three random entries from the matrix to zero. In some examples, the user device may determine the entries from the matrix to set to zero based on randomly sampling the entries from the matrix. For example, based on random sampling, the user device may determine to set the $5^{th}$, $6^{th}$, and $8^{th}$ entries of the matrix to zero. Therefore, using the example above, the user device may set the $5^{th}$ entry in the first row, the $1^{st}$ entry in the second row, and the $3^{rd}$ entry in the second row to zero using the sparsify function. The above example is merely exemplary and the sparsify function may operate differently to generate the enrollment data. For instance, the user device may assign a different numbering to the entries of the matrix (e.g., the last row of the matrix may be entries 1-5, the second row may be 6-10, and the first row may be 11-15).

In other words, the user device may use the biometric registration data and the index translate point vector (e.g., secret key) to generate the enrollment data. Additionally, and/or alternatively, the user device may use the biometric registration data and the index translate point vector along with the negative biometric data and the negative index translate point vector to generate the enrollment data (e.g., generate two matrices and add the matrices together). Additionally, and/or alternatively, the user device may use the biometric registration data, the index translate point vector, the negative biometric data, and the negative index translate point vector as well as the noise vector to generate the enrollment data. Additionally, and/or alternatively, the user device may use the biometric registration data, the index translate point vector, the negative biometric data, and the negative index translate point vector as well as the sparsify function to generate the enrollment data. Additionally, and/or alternatively, the user device may use the biometric registration data, the index translate point vector, the negative biometric data, the negative index translate point vector, the noise vector, and the sparsify function to generate the enrollment data. For instance, using the biometric registration data, the index translate point vector, the negative biometric data, and the negative index translate point vector, the user device may generate first intermediate enrollment data. Using the noise vector and the first intermediate enrollment data, the user device may generate second intermediate enrollment data. Using the sparsify function and the second intermediate enrollment data, the user device may generate the final enrollment data (e.g., the enrollment data that is sent to the computing platform 110).

In some instances, the index translate function may be and/or include a crossover method, algorithm, or operator that re-arranges or obfuscates the vectors (e.g., the vector of the biometric registration data and/or the index translate point vector) by stitching the vectors together using one or more crossover points.

At block 308, the user device generates a public key for the user based on the index translate point array (e.g., the secret key). For example, the user device may generate a public and private key pair based on the secret key. The private and public key pair may be used to encrypt information and ensure that data being provided by different entities (e.g., the first user device 104 and the enterprise organization computing platform 110) is secure. For instance, the private key may be used to encrypt information, and the public key may be shared with another entity and used to decrypt the encrypted information. The user device may use any type of algorithm, method or process to generate the public and private key pair using the secret key. For instance, the user device may use the secret key as a seed for a pseudorandom number generator (PRNG), which is deterministic (same seed implies same output sequence), to produce or generate the private and public key pair. Additionally, and/or alternatively, the user device may use discrete-logarithm based algorithms, digital signature algorithms (DSA), ElGamal encryption, Diffie-Hellman key exchange, elliptic-curve variants, Rivest, Shamir, and Adleman (RSA) encryption algorithms, and/or other algorithms to generate the private and public key pair based on the secret key.

At block 310, the user device provides, to a computing platform (e.g., the enterprise organization computing platform 110), the public key and the enrollment data to enroll the user into a service. For instance, after determining the enrollment data (e.g., a matrix based on the secret key, the biometric registration data, and/or other data, algorithms, or functions described above) and generating the public and private key pair, the user device may provide the public key and enrollment data to the computing platform 110. Based on providing the public key and enrollment data, the computing platform 110 may enroll the user 102 into the service.

In other words, using blocks 302-310, the user 102 may be enrolled into a service provided by the enterprise organization. For example, the computing platform 110 may enroll the user 102 into the service based on obtaining the public key and the enrollment data. In some instances, the computing platform 110 may store the public key, the enrollment data, and/or an identifier (e.g., a username and password) linking the public key and the enrollment data to user 102. The user device may delete or remove the private and public key pair, the enrollment data, the biometric registration data, the secret key, and/or other information from blocks 302-310 after the user 102 is enrolled into the service. Therefore, the biometric feature might not be stored or saved by the user device.

At block 312, the user device (e.g., the first and/or second user device 104, 108) authenticates the user for the service by recreating the index translate point array based on the enrollment data. For instance, after enrolling and accessing the content (e.g., the service) in a first session (e.g., from blocks 302-310), the user 102 may seek to access the content in a second, subsequent session (e.g., the next day). The user device may provide a request to access the content and the computing platform 110 may provide the stored enrollment data obtained from block 310 back to the user device. The user device may recreate the index translate point vector (e.g., the secret key) based on the enrollment data. Using the index translate point vector, the user device may authenticate the user for the service. This is described in further detail in FIG. 4.

Figure 4:
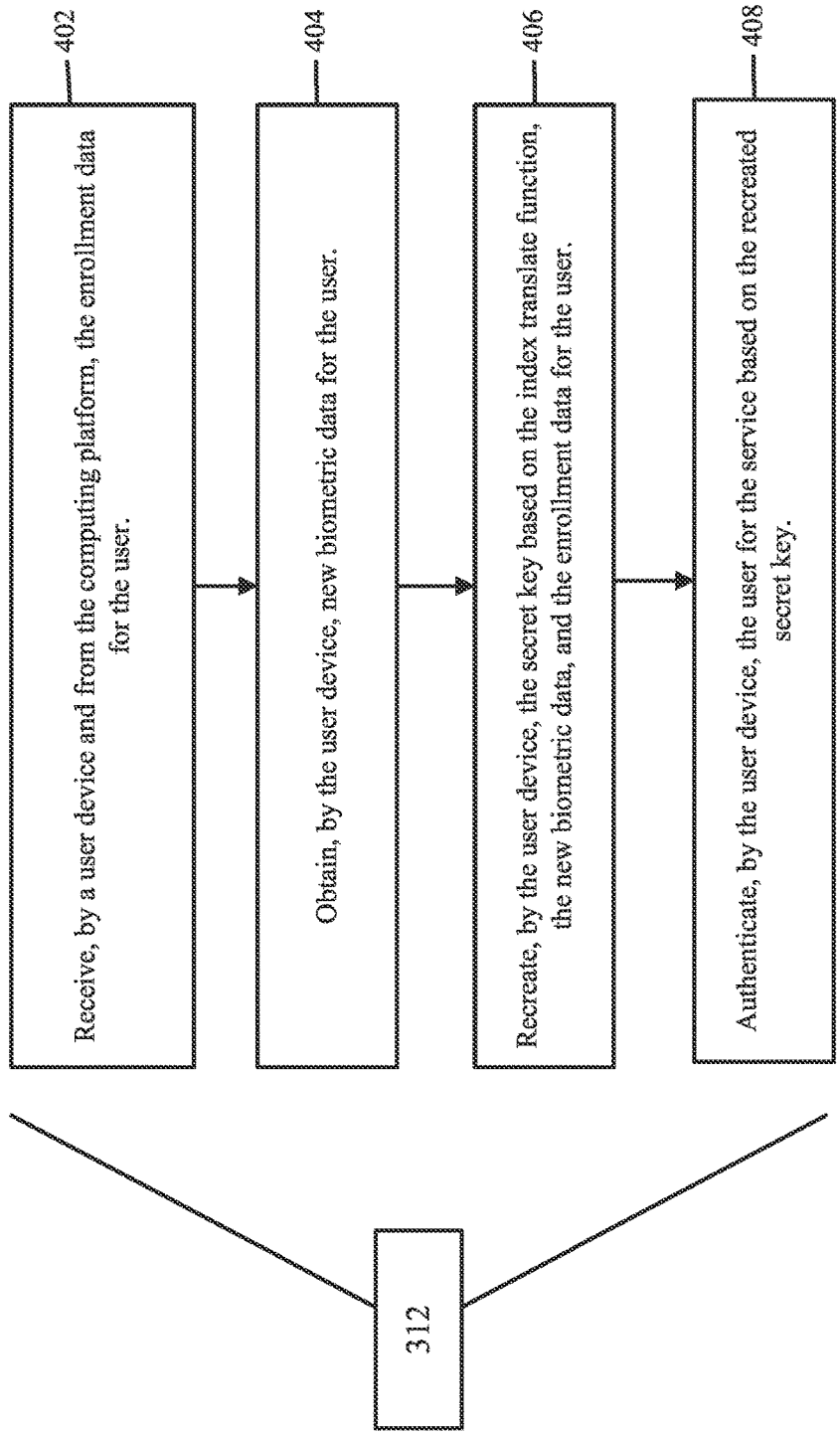
FIG. 4 is another exemplary process for generating and using biometric secret keys in accordance with one or more examples of the present application.

FIG. 4 is an exemplary process 400 for generating and using biometric secret keys in accordance with one or more examples of the present application. The process 400 may be performed by the first user device 104 and/or the second user device 108 of environment 100 shown in FIG. 1. It will be recognized that any of the following blocks may be performed in any suitable order, and that the process 400 may be performed in any suitable environment. The descriptions, illustrations, and processes of FIG. 4 are merely exemplary and the process 400 may use other descriptions, illustrations, and processes for generating and using biometric secret keys.

Process 400 describes block 312 of process 300 in more detail. For instance, at block 402, the user device receives the enrollment data for the user 102. For example, in a second session, the user 102 may seek to access the service again that is provided by the enterprise organization. The user 102 may use the same user device that was used for the enrollment process (e.g., the first user device 104) or another user device (e.g., the second user device 108) that was not used for the enrollment process. Using the user device (e.g., the first or second user device 104, 108), the user 102 may provide information to the computing platform 110 (e.g., identification information such as a username and/or password). Based on providing the information, at block 402, the user device receives the previously stored enrollment data that was created for the user 102 in blocks 302-310.

At block 404, the user device obtains new biometric data for the user 102. The new biometric data may be another vector that is based on a newly obtained biometric feature or identifier of the user 102. For instance, referring back to block 302, the user device may have obtained a facial scan or voiceprint of the user 102, and used the facial scan or voiceprint (e.g., the biometric identifier) to generate the biometric registration data. Here, at block 404, the user device obtains a new biometric feature or identifier (e.g., a new facial scan or a new voiceprint) of the user 102. The user device may generate the new biometric data based on the new biometric feature or identifier and one or more methods, processes, and/or algorithms described above.

At block 406, the user device recreates the secret key (e.g., the index translate point vector) based on the index translate function, the new biometric data, and the enrollment data for the user. For example, the user device may determine the index translated vectors (e.g., a plurality of index translated vectors) by finding (e.g., determining) the inverse of the index translate function using the new biometric data. For instance, in some variations, the new biometric data may be a vector such as [0, 2, 6, 3, 4].

Because the new biometric data is from the same user 102 as the biometric registration data, the two vectors (e.g., the new biometric data and the biometric registration data) should be substantially similar. Then, instead of using the secret key (e.g., the index translate point vector or array) for the index translate function as described above at block 306, at block 406, the user device may use recreate data (e.g., a recreate vector) with the new biometric data and the index translate function to determine one or more true index translated vectors. For example, as mentioned previously, the secret key may be associated with a number of entries (e.g., the number of vectors, N) and the dimensions (e.g., d) of the secret key. The dimensions may indicate a maximum value for the secret key (e.g., if the dimensions is 4, then each of the entries within the secret key is a value from 1 to 4). The recreate data may be a vector that is based on the dimensions of the secret key such as [1, 2, 3, 4]. In other words, the recreate data may be a vector and the number of entries within the vector is based on the dimensions of the secret key. Using the index translate function, the user device may determine a matrix with 5 columns and 4 rows (e.g., the 5 columns from the new biometric data and the 4 rows from the recreate data). Thus, the first row of the matrix may be a shift of the entries of the new biometric data by 1 (e.g., [4, 0, 2, 6, 3]), the second row may be a shift by 2 (e.g., [3, 4, 0, 2, 6]), and so on. The index translated vectors (e.g., a plurality of index translated vectors) may be indicated by the matrix and/or rows generated using the new biometric data and the recreate data. As mentioned previously, the above use of the index translate function is merely exemplary and the index translate function may operate differently to generate the index translated vector. For example, in another instance, the matrix may be transposed. Additionally, and/or alternatively, the index translate function may include and/or use one or more operations (e.g., adding by "1" or multiplying by "2") as described above.

In some instances, the user device may recreate the secret key based on the index translated vectors. Additionally, and/or alternatively, the user device may recreate the secret key based on the index translated vectors and the received enrollment data. For instance, in some variations, the user device may perform one or more operations or processes based on the index translated vector and the received enrollment data. For example, the user device may generate a plurality of enrollment-based index translated vectors based on the index translated vectors and the received enrollment data. For instance, the user device may perform matrix multiplication of the plurality of index translated vectors (e.g., the matrix that is generated based on the new biometric data and the recreate data) and the enrollment data (e.g., the matrix that was generated during the enrollment process). Based on performing the matrix multiplication, the user device may obtain a new matrix (e.g., the plurality of enrollment-based index translated vectors). The user device may use the new matrix to recreate the secret key. Additionally, and/or alternatively, the user device may utilize other distance/similarity metrics to determine affinity between the two matrices (e.g., the index translated vectors and the enrollment data). The user device may use any of these affinity matrices to recreate the secret key.

Additionally, and/or alternatively, the user device may obtain the recreated secret key based on a mathematical operation and the plurality of enrollment-based index translated vectors. For instance, the mathematical operation may be an argmax operation, an argmin operation, or any other mathematical operation. For example, the user device may apply the argmax operation to affinity matrices computed using similarity based metrics and/or the argmin operation to affinity matrices using distance based metrics. By applying the argmax operation, the user device may recreate the secret key (e.g., the index translate point vector that was generated at block 304). For instance, by using the inner products, the index translate function, the new biometric data for the user, the recreate data, and/or other information, the user device may determine when two vectors are similar due to the inner products (e.g., dot products) being maximized. If the two vectors are not similar, then the inner products are lower. As such, by finding the indices where the inner products are maximized, the user device may determine or recreate the secret key that was generated at block 304.

At block 408, the user device authenticates the user 102 for the service based on the recreated secret key. For example, using the recreated secret key, the user device may generate a public and private key pair. As mentioned above, in some variations, the user device may use a PRNG with the recreated secret key as the seed to generate the public and private key pairs. By using a deterministic algorithm and recreating the secret key that was used during enrollment, the user device may generate a public and private key pair that is the same as the public and private key pair from the enrollment phase. The user device may then encrypt a message (e.g., a challenge) using the private key from the key pair, and provide the encrypted message to the computing platform 110. The computing platform 110 may decrypt the encrypted message based on the stored public key from the enrollment process. Based on the decryption, the computing platform 110 may determine whether the user 102 is authenticated. Based on the user 102 being authenticated, the user device may gain access to the service provided by the enterprise organization.

Therefore, by using the processes 300 and/or 400, the privacy of the user 102 is preserved and no biometric template (e.g., biometric feature and/or identifier) is stored. In addition, the individual device does not need to be enrolled as the user 102 may use multiple different devices to access the service. Further, there is additional data encryption on the device using the secret key.

FIGS. 5A-5D show an exemplary event sequence 500 for generating and using biometric secret keys in accordance with one or more examples of the present application. However, the event sequence 500 is merely an example and other types of event sequences are contemplated herein including by performing any of the following blocks in any suitable order. For example, as mentioned above, the processes and methods described herein may be used to generate a recoverable secret key from a measurable biometric feature. The biometric feature may be converted into a vector in a similarity preserving vector space. The processes may use a generate method (e.g., blocks 302-310 of FIG. 3 and/or blocks 502-514 of FIG. 5 described below) and/or a recreate method (e.g., block 312 of FIG. 3, blocks 402-408 of FIG. 4, and blocks 516-524 of FIG. 5 described below). For instance, the generate method may be used to generate a secret key from a measurement biometric feature and transformed into a suitable vector space. The recreate method may be used to recreate the secret key using a repeated biometric feature.

Figure 5A:
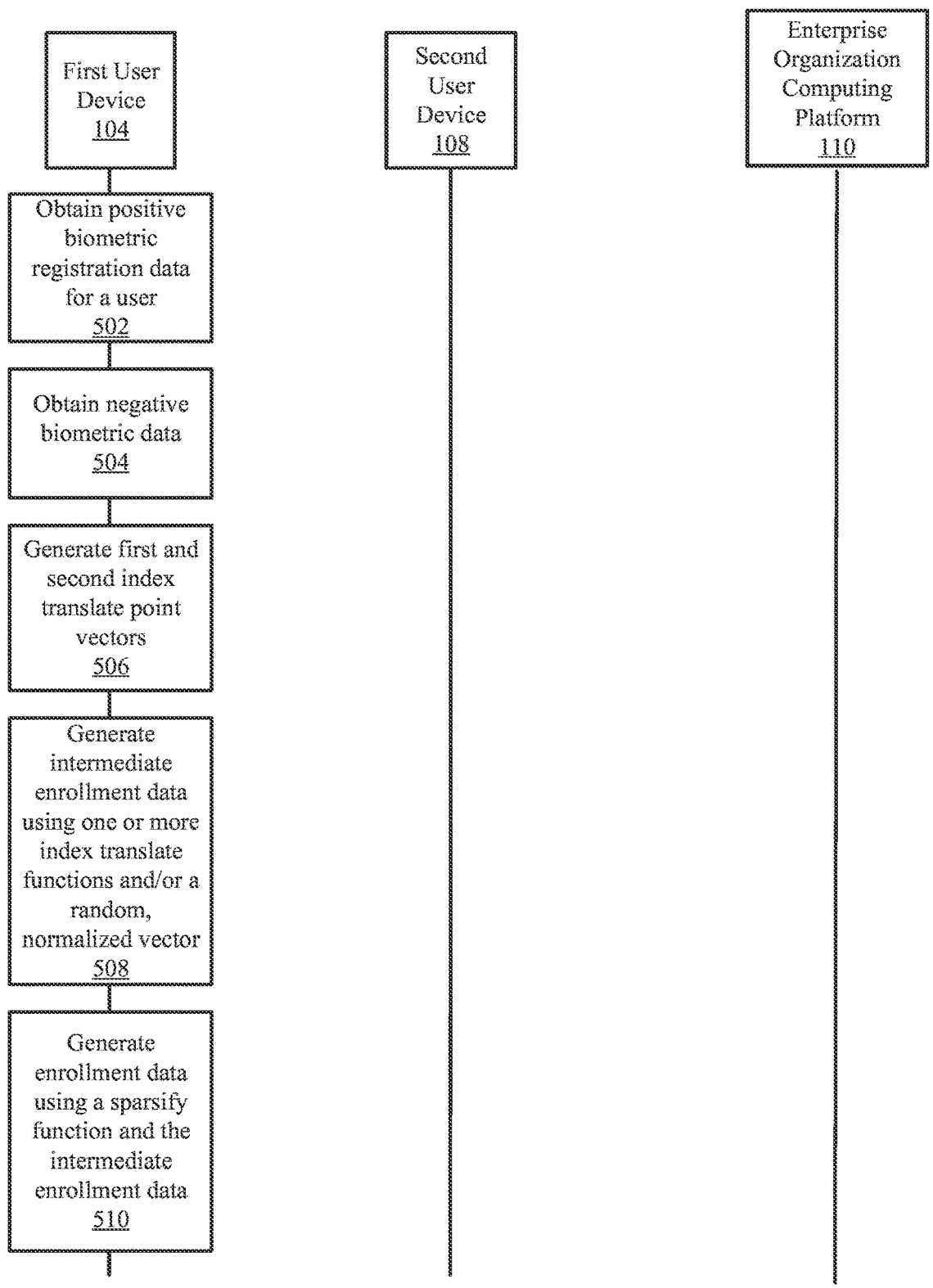
FIGS. 5A-5D show an exemplary event sequence for generating and using biometric secret keys in accordance with one or more examples of the present application.

Referring to FIG. 5A, at block 502, the first user device 104 obtains positive biometric registration data for a user (e.g., user 102). For instance, as mentioned above, the first user device 104 may obtain biometric feature(s) of the user 102 (e.g., a fingerprint, facial scan, and/or voiceprint of the user 102). The first user device 104 may determine the positive biometric registration data (e.g., a vector of values) based on the obtained biometric feature(s).

At block 504, the first user device 104 obtains negative biometric data. For instance, as mentioned above, the negative biometric data may be any type of biometric data that is different from the positive biometric registration data.

At block 506, the first user device 104 generates first and second index translate point vectors. The first index translate point vector may be the secret key/the index translate point vector of block 304 and the second index translate point vector may be the negative index translate point vector described above. In some instances, the first index translate point vector (e.g., the secret key) may be [3, 7, 1, 6, 4, 8, 10, 2].

At block 508, the first user device 104 generates intermediate enrollment data using one or more index translate functions and a random, normalized vector (e.g., a noise vector). For instance, the first user device 104 may generate the intermediate enrollment data using the index translate functions, the positive biometric registration data, the negative biometric data, the noise vector, and the first and second index translate point vectors.

At block 510, the first user device 104 generates the enrollment data using a sparsify function and the intermediate enrollment data. For instance, FIG. 6 shows an exemplary data structure 600 of the enrollment data in accordance with one or more examples of the present application. For example, FIG. 6 shows the enrollment data for the user 102 based on using the index translate functions.

Figure 5B:
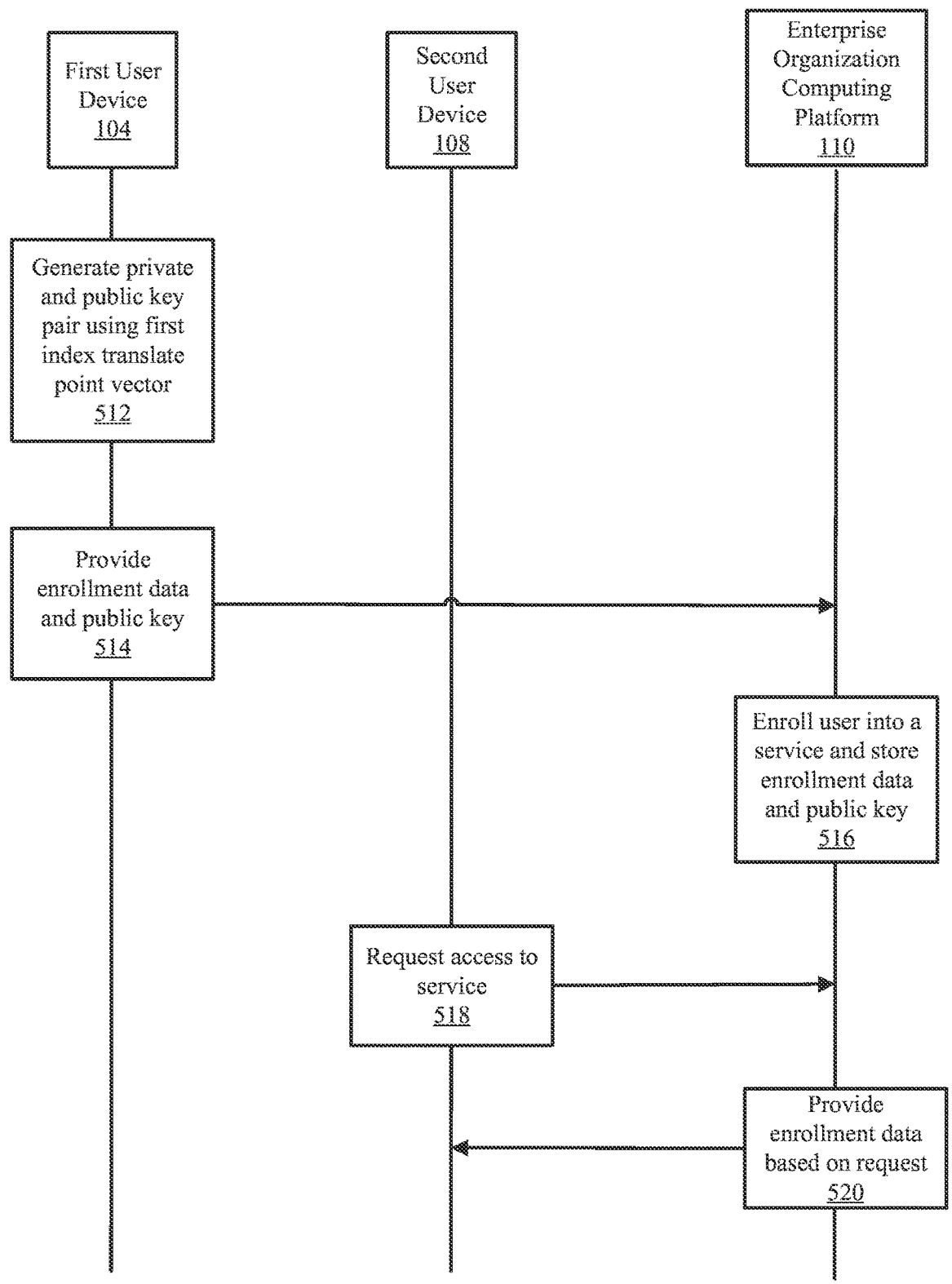

Referring to FIG. 5B, at block 512, the first user device 104 generates a private and public key pair using the first index translate point vector (e.g., the secret key/the index translate point vector of block 304). At block 514, the first user device 104 provides the enrollment data and the public key to the enterprise organization computing platform 110. At block 516, the enterprise organization computing platform 110 enrolls the user 102 into a service and stores the enrollment data and the public key.

At block 518, the second user device 108 requests access to the service. For instance, the user 102 may use a second user device 108 to request a second session for the service. At block 520, the enterprise computing platform 110 provides the enrollment data based on the request.

Figure 5C:
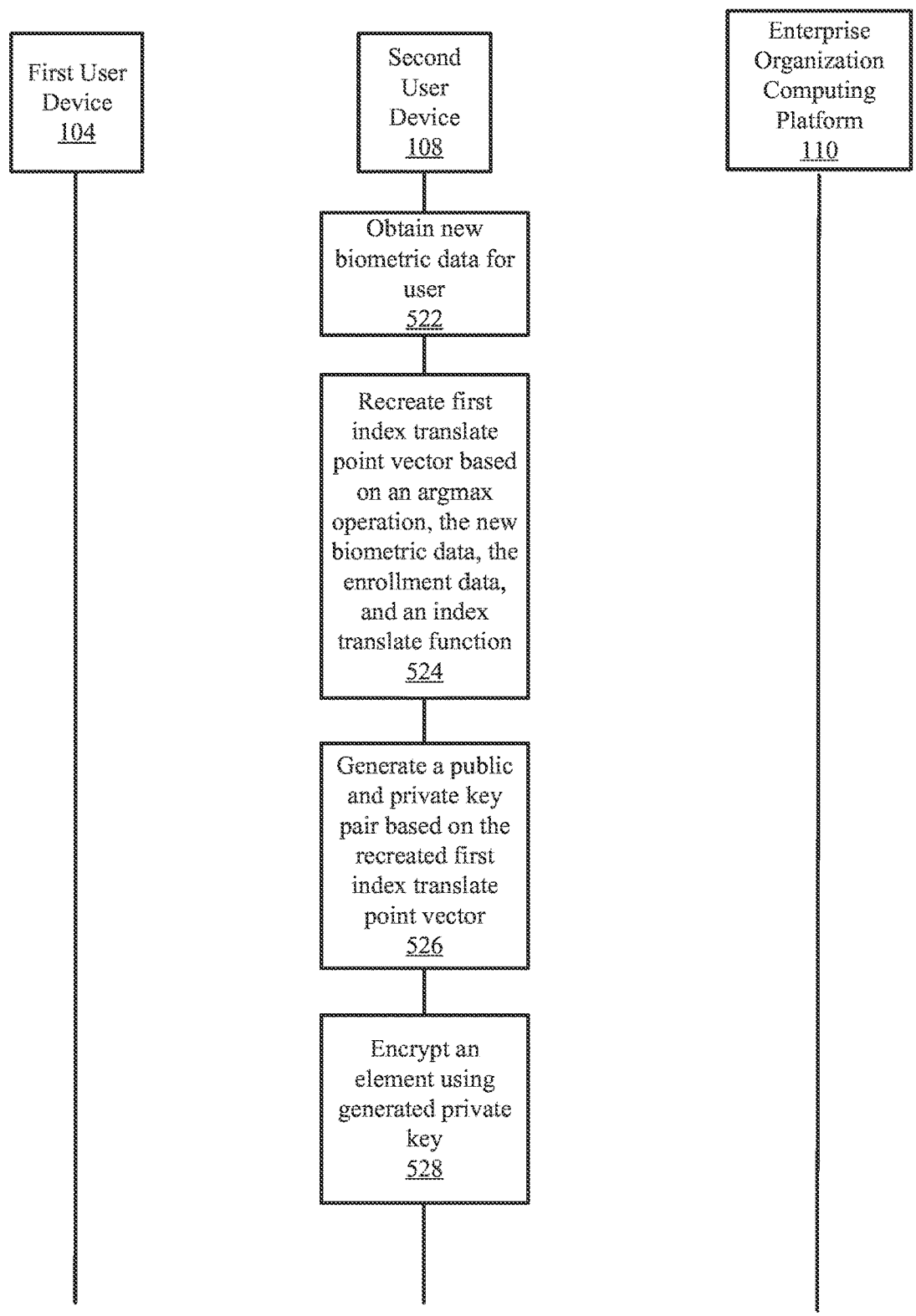

Referring to FIG. 5C, at block 522, the second user device 108 obtains new biometric data for the user 102. At block 524, the second user device 108 recreates the first index translate point vector (e.g., the secret key) based on an argmax operation, the new biometric data, the enrollment data, and an index translate function. For example, FIG. 7 shows an exemplary data structure 700 of the index translated vector in accordance with one or more examples of the present application. For instance, based on the new biometric data and the index translate function, the second user device 108 determines the index translated vector. FIG. 8 shows an exemplary data structure 800 of the plurality of index translated vectors in accordance with one or more examples of the present application. For example, based on the index translated vector and the enrollment data, the second user device 108 determines the index translated vectors. For instance, by using matrix multiplication on the data structures from FIGS. 6 and 7, the second user device 108 determines the values for the data structure 800, which indicate the index translated vectors. Then, using a mathematical operation (e.g., argmax operation), the second user device 108 may recreate the secret key (e.g., the vector [3, 7, 1, 6, 4, 8, 10, 2] from block 506). The values for the data structures 600, 700, 800 as well as the secret key are merely examples, and the event sequence 500 may use any number of different data structures (e.g., matrices with different number of entries, different number of rows, and/or different number of columns) and/or values within the data structures.

At block 526, the second user device 108 generates a public and private key pair based on the recreated first index translate point vector. At block 528, the second user device 108 encrypts an element (e.g., a message) using the generated private key.

Figure 5D:
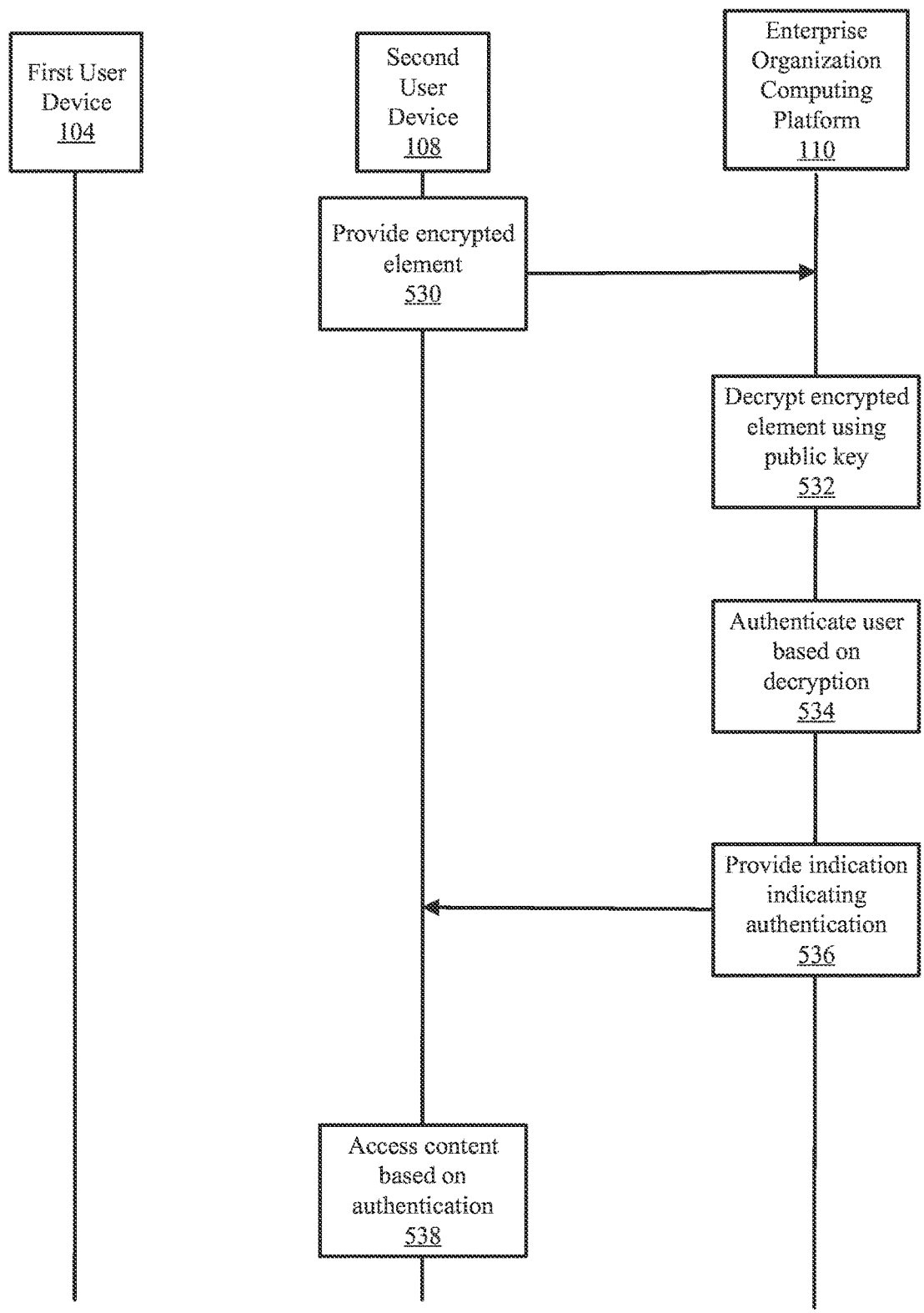

Referring to FIG. 5D, at block 530, the second user device 108 provides the encrypted element to the enterprise organization computing platform 110. At block 532, the enterprise organization computing platform 110 decrypts the encrypted element using the previously stored public key. At block 534, the enterprise organization computing platform 110 authenticates the user based on the decryption. At block 536, the enterprise organization computing platform 110 provides an indication to the second user device 108 indicating the authentication. At block 538, the second user device 108 accesses content based on the authentication.

In some examples, a computing device (e.g., the first user device 104, the second user device 108, and/or the enterprise organization computing platform 110) may determine an algorithm to convert the biometric features to the biometric registration data and/or the negative biometric data. For example, as mentioned previously in block 302, the user device may convert the biometric feature of the user 102 into a vector based on one or more algorithms. Prior to block 302, the computing device may determine whether the algorithm is sufficiently accurate enough to use for processes 300 and 400. For example, the computing device may obtain two or more vectors of a person's biometric feature (e.g., a facial scan). For instance, to test whether the algorithm is sufficiently accurate, the computing device may obtain two or more samples of a person's biometric features (e.g., two images of the person's facial features or two voiceprints), and convert the sample of the person's biometric features into positive biometric data (e.g., a first positive biometric data and a second positive biometric data). The computing device may obtain a vector of another person's biometric feature (e.g., another person's facial scan). This vector may be negative biometric data. Then, the computing device may compare the first positive biometric data with the negative biometric data and the first positive biometric data with the second positive biometric data. The computing device may use a distance calculation, other similarity measurements, and/or other statistical measurements for this comparison. Based on the comparison, the computing device may use one or more thresholds to determine whether the algorithm used to change the biometric feature to the vector is sufficiently accurate enough (e.g., the comparison measurements such as a distance measurement is above or below certain thresholds).

Figure 9:
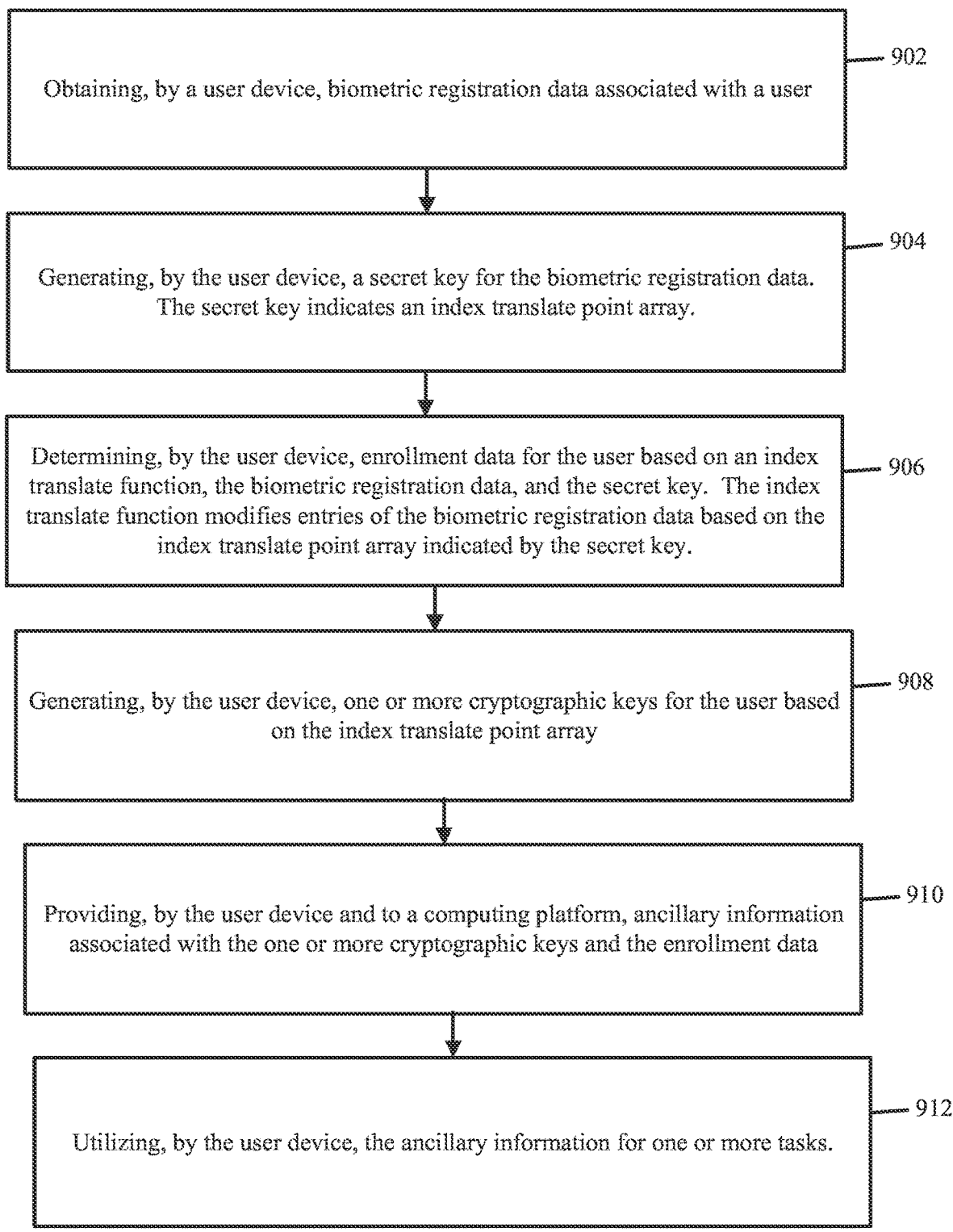
FIG. 9 is another exemplary process for generating and using biometric secret keys in accordance with one or more examples of the present application.

FIG. 9 is another exemplary process 900 for generating and using biometric secret keys in accordance with one or more examples of the present application. The process 900 may be performed by the first user device 104 and/or the second user device 108 of environment 100 shown in FIG. 1. It will be recognized that any of the following blocks may be performed in any suitable order, and that the process 900 may be performed in any suitable environment. The descriptions, illustrations, and processes of FIG. 9 are merely exemplary and the process 900 may use other descriptions, illustrations, and processes for generating and using biometric secret keys.

Process 900 may be used to generate the biometric secret keys, and use the biometric secret keys in symmetric encryption as well as asymmetric encryption. For instance, in some examples, processes 300-500 of FIGS. 3-5D describe process 900 in more detail. For instance, the user device (e.g., the first user device 104 and/or the second user device 108) may perform blocks 902-906 similarly to blocks 302-306 of FIG. 3. At block 908, the user device generates one or more cryptographic keys for the user based on the index translate point vector. The one or more cryptographic keys include the public key and/or the private key. In other words, block 308 of FIG. 3 may show an example of block 908 (e.g., the one or more cryptographic keys include a public key and/or a private key). For instance, block 908 may be used for both symmetric and asymmetric encryption, and block 308 provides details regarding the asymmetric encryption example. At block 910, the user device provides, to a computing platform, ancillary information associated with the one or more cryptographic keys and the enrollment data. For the asymmetric encryption (e.g., block 310 of FIG. 3), the ancillary information includes the public key and the enrollment data that are used to enroll the user into the service. At block 912, the user device utilizes the ancillary information for one or more tasks. For instance, the user device authenticates the user for the service by recreating the index translate point vector based on the enrollment data. For the asymmetric encryption (e.g., block 312 of FIG. 3 and block 408 of FIG. 4), as described above, using the recreated secret key, the user device generates a public and private key pair. The user device may then encrypt a message (e.g., a challenge) using the private key from the key pair, and provide the encrypted message to the computing platform 110. The computing platform 110 may decrypt the encrypted message based on the stored public key from the enrollment process. Based on the decryption, the computing platform 110 may determine whether the user 102 is authenticated. Based on the user 102 being authenticated, the user device may gain access to the service provided by the enterprise organization.

In other examples, process 900 may be used to generate the biometric secret keys, and use the biometric secret keys using symmetric encryption. For example, in symmetric encryption, blocks 902-906 may function similarly to blocks 302-306 of FIG. 3. At block 908, after generating the secret key and determining the enrollment data, the user device generates one or more cryptographic keys for the user based on the index translate point vector. The one or more cryptographic keys may be an encryption key. For instance, the user device may generate the encryption key using one or more encryption methods such as, but not limited to, a password-based key derivation function 2 (PBKDF2) method, a blowfish and crypt (bcrypt) method, one or more hashing algorithms, and/or other types of encryption methods.

At block 910, the user device provides, to a computing platform (e.g., the computing platform 110), ancillary information associated with the one or more cryptographic keys and the enrollment data. In the asymmetric example described above, the ancillary information includes the public key and the enrollment data. In the symmetric example, the user device may encrypt sensitive data associated with the user using the one or more cryptographic keys (e.g., the encryption key). For instance, the sensitive data may be any data that is associated with the user 102 such as, but not limited to, the user's password on any system, credit card number, social security number, and so on. After, the user device may provide the ancillary information to the computing platform. The ancillary information may include the encrypted sensitive data and the enrollment data. The computing platform may use the ancillary information to enroll the user into the service. For instance, the computing platform may store the ancillary information (e.g., the encrypted sensitive data and the enrollment data) in order to enroll the user into the service. Further, the user device may delete information used during the enrollment process such as the secret key, the biometric registration data, the enrollment data, the encryption key, and/or other information.

At block 912, the user device utilizes the ancillary information for one or more tasks. For instance, similar to the asymmetric example, the user device may use blocks 402-406 of FIG. 4 described above to recreate the secret key. For example, in a second session, the user device may provide, to the computing platform, a request access to the service again. The request may indicate user information such as a user name. Based on the request, the computing platform may provide the enrollment data, encrypted sensitive data, and/or the ancillary information back to the user device. The user device may recreate the secret key based on the enrollment data as described above.

Afterwards, the user device may recreate the encryption key using the secret key. The user device may then decrypt the encrypted sensitive data using the encryption key, and use the decrypted sensitive data for one or more tasks. For instance, the user device may use the decrypted sensitive data (e.g., credit card information) for purchasing one or more products.

In some instances, for the symmetric example, at block 910, the user device might not provide the encrypted sensitive data and/or the enrollment data to the computing platform. For example, instead of the computing platform storing the encrypted sensitive data and the enrollment data, the encrypted sensitive data and the enrollment data are stored on the user device or on a device (e.g., external memory) associated with the user device. For instance, at block 910, the user device stores the encrypted sensitive data and the enrollment data in memory associated with the user device. In other words, to provide additional security, the user device might not provide the encrypted sensitive data and the enrollment data to the computing platform, and instead store this information locally.

In such instances, at block 912, instead of receiving the ancillary information (e.g., the encrypted sensitive data and/or the enrollment data), the user device may retrieve the encrypted sensitive data and/or the enrollment data from memory. Afterwards, the user device may recreate the secret key based on the enrollment data as described above, and recreate the encryption key using the secret key. The user device may then decrypt the encrypted sensitive data using the encryption key, and use the decrypted sensitive data for one or more tasks. For instance, the user device may use the decrypted sensitive data (e.g., credit card information) for purchasing one or more products.

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. A method, comprising:
   obtaining, by a user device, biometric registration data associated with a user;
   generating, by the user device, a secret key for the biometric registration data, wherein the secret key indicates an index translate point array;
   determining, by the user device, enrollment data for the user based on an index translate function, the biometric registration data, and the secret key, wherein the index translate function modifies entries of the biometric registration data based on the index translate point array; and
   generating, by the user device, one or more cryptographic keys for the user based on the index translate point array.

2. The method of claim 1, wherein generating the one or more cryptographic keys comprises generating an encryption key based on the index translate point array, and wherein the method further comprises:
   encrypting sensitive data associated with the user using the encryption key; and
   storing the enrollment data and encrypted sensitive data associated with the user in memory of the user device.

3. The method of claim 2, further comprising:
   subsequent to storing the enrollment data and the encrypted sensitive data, deleting the encryption key;
   retrieving, from the memory of the user device, the encrypted sensitive data and the enrollment data;
   obtaining new biometric data associated with the user; and
   recreating the secret key based on the retrieved enrollment data, the new biometric data, and the index translate function.

4. The method of claim 3, further comprising:
   re-generating the encryption key based on the recreated secret key;
   decrypting the encrypted sensitive data using the re-generated encryption key; and
   utilizing the decrypted sensitive data for one or more tasks.

5. A system, comprising:
   a first user device configured to:
      obtain biometric registration data associated with a user;
      generate a secret key for the biometric registration data, wherein the secret key indicates an index translate point array;
      determine enrollment data for the user based on an index translate function, the biometric registration data, and the secret key, wherein the index translate function modifies entries of the biometric registration data based on the index translate point array;
      generate one or more cryptographic keys for the user based on the index translate point array; and
      provide, to a computing platform, ancillary information associated with the one or more cryptographic keys and the enrollment data.

6. The system of claim 5, wherein the biometric registration data comprises a biometric user array indicating a biometric representation of the user, wherein the biometric representation of the user is associated with a fingerprint of the user or a facial recognition image of the user.

7. The system of claim 5, wherein the first user device is further configured to obtain second biometric data that is different from the biometric registration data associated with the user, and
   wherein determining the enrollment data for the user comprises:
      determining first index translate outputs based on the index translate point array, the biometric registration data, and the index translate function;
      determining second index translate outputs based on the second biometric data and the index translate function; and
      generating the enrollment data based on the first index translate outputs and the second index translate outputs.

8. The system of claim 7, wherein generating the enrollment data comprises:
   generating intermediate enrollment data using the first index translate outputs and the second index translate outputs; and
   generating the enrollment data based on using a sparsify function and the intermediate enrollment data, wherein the sparsify function resets at least one entry from the intermediate enrollment data to zero.

9. The system of claim 8, wherein generating the intermediate enrollment data is based on a noise vector.

10. The system of claim 5, wherein generating the one or more cryptographic keys comprises generating a private and public key pair comprising a public key and a private key, and wherein providing the ancillary information comprises providing, to the computing platform, the public key and the enrollment data.

11. The system of claim 10, wherein the first user device is further configured to:
   subsequent to providing the public key and the enrollment data to the computing platform, delete the secret key and the private and public key pair;
   receive, from the computing platform, the enrollment data;
   obtain new biometric data associated with the user; and
   recreate the secret key based on the received enrollment data, the new biometric data, and the index translate function.

12. The system of claim 11, wherein recreating the secret key comprises:
   determining one or more index translated vectors based on the index translate function and the new biometric data;
   determining a plurality of enrollment-based index translated vectors based on the one or more index translated vectors and the enrollment data; and
   obtaining the recreated secret key based on a mathematical operation and the plurality of enrollment-based index translated vectors.

13. The system of claim 11, wherein the first user device is further configured to:
   re-generate the private and public key pair based on the recreated secret key;
   encrypt an element using the private key from the re-generated private and public key pair; and
   provide the encrypted element to the computing platform.

14. The system of claim 13, further comprising:
   the computing platform, wherein the computing platform is configured to:
      authenticate the user based on decrypting the encrypted element using the public key; and
      provide an indication indicating the authentication of the user to the first user device.

15. The system of claim 10, further comprising:
   a second user device configured to:
      receive, from the computing platform, the enrollment data;
      obtain new biometric data associated with the user; and
      recreate the secret key based on the received enrollment data, the new biometric data, and the index translate function.

16. The system of claim 15, wherein the second user device is further configured to:
   re-generate the private and public key pair based on the recreated secret key;
   encrypt an element using the private key from the re-generated private and public key pair; and
   provide the encrypted element to the computing platform, and
   wherein the system further comprises the computing platform, wherein the computing platform is configured to:
      authenticate the user based on decrypting the encrypted element using the public key; and
      provide an indication indicating the authentication of the user to the second user device.

17. The system of claim 5, wherein generating the one or more cryptographic keys comprises generating an encryption key based on the index translate point array, and wherein providing the ancillary information comprises:
   generating encrypted sensitive data associated with the user based on the encryption key; and
   providing the encrypted sensitive data and the enrollment data to the computing platform, and
   wherein the computing platform is configured to store the encrypted sensitive data and the enrollment data.

18. The system of claim 17, wherein the first user device is further configured to:
   subsequent to providing the encrypted sensitive data and the enrollment data to the computing platform, delete the secret key and the encryption key;
   receive, from the computing platform, the encrypted sensitive data and the enrollment data;
   obtain new biometric data associated with the user; and
   recreate the secret key based on the received enrollment data, the new biometric data, and the index translate function.

19. The system of claim 18, wherein the first user device is further configured to:
   re-generate the encryption key based on the recreated secret key;
   decrypt the encrypted sensitive data using the re-generated encryption key; and
   utilize the decrypted sensitive data for one or more tasks.

20. A non-transitory computer-readable medium having processor-executable instructions stored thereon, wherein the processor-executable instructions, when executed, facilitate:
   obtaining biometric registration data associated with a user;
   generating a secret key for the biometric registration data, wherein the secret key indicates an index translate point array;
   determining enrollment data for the user based on an index translate function, the biometric registration data, and the secret key, wherein the index translate function modifies entries of the biometric registration data based on the index translate point array; and
   generating one or more cryptographic keys for the user based on the index translate point array.

* * * * *